(12) United States Patent
Mortlock et al.

(10) Patent No.: US 6,549,200 B1
(45) Date of Patent: Apr. 15, 2003

(54) GENERATING AN IMAGE OF A THREE-DIMENSIONAL OBJECT

(75) Inventors: Andrew Nicholas Mortlock, Suffolk (GB); Philip Julian Sheppard, Suffolk (GB); Nicholas James Wallin, London (GB)

(73) Assignee: British Telecommunications public limited company, London (GB)

(*) Notice: Subject to any disclaimer, the term of this patent is extended or adjusted under 35 U.S.C. 154(b) by 0 days.

(21) Appl. No.: 09/125,141

(22) PCT Filed: Jun. 17, 1998

(86) PCT No.: PCT/GB98/01772
§ 371 (c)(1),
(2), (4) Date: Aug. 11, 1998

(87) PCT Pub. No.: WO98/58351
PCT Pub. Date: Dec. 23, 1998

(30) Foreign Application Priority Data

Jun. 17, 1997 (EP) ................................. 97304217

(51) Int. Cl.$^7$ .............................................. G06T 15/00

(52) U.S. Cl. ...................................... 345/419; 345/420

(58) Field of Search ............................. 345/419, 582, 345/583, 420

(56) References Cited

U.S. PATENT DOCUMENTS

| 5,179,638 A | | 1/1993 | Dawson et al. |
| 5,786,822 A | * | 7/1998 | Sakaibara et al. ........... 345/430 |

FOREIGN PATENT DOCUMENTS

| EP | 0454129 A | | 10/1991 | |
| EP | 758 118 | * | 2/1997 | ........... G06T/17/00 |
| GB | 2 287 387 | * | 9/1995 | ........... G06T/15/00 |

* cited by examiner

*Primary Examiner*—Mark Zimmerman
*Assistant Examiner*—Lance W. Sealey
(74) *Attorney, Agent, or Firm*—Nixon & Vanderhye P.C.

(57) ABSTRACT

An image representing a three-dimensional object is modelled as a stored set of parameters representing a model of a three-dimensional object and at least two two-dimensional images of the object, each image representing the object from a unique direction of view (x, y, z). The parameters include parameters defining the positions of a plurality of vertex points in a virtual space and parameters defining relationships between vertex points and hence surface elements of the object. For at least a subset of the surface elements a measure relative to each direction of view is determined, each measure being representative of the deviation of the surface of the element from the normal to the direction of view. The direction of view which exhibits the least deviation is then identified and texture applied to the surface element from the two-dimensional image which corresponds to the identified direction of view.

13 Claims, 9 Drawing Sheets

GENERATING AN IMAGE OF A THREE-DIMENSIONAL OBJECT

BACKGROUND OF THE INVENTION

This invention relates to the generation of an image of a three-dimensional object by application of texture to a three-dimensional (3D) model of the object.

BACKGROUND OF THE INVENTION

Of particular interest to the applicant is the virtual representation of a human head and, throughout this description, reference will be made to a 3-D model of a human head. However it will be appreciated that the technique can be applied to a 3-D model of any object.

The requirement for a possible virtual representation of a human head was identified over ten years ago, and development work resulted in a head being represented in software by a model in conjunction with texture mapping of facial features onto the head. An example of such a technique is described in Welsh W J, Simons A D, Hutchinson R A and Searby S, "Synthetic face generation for enhancing a user interface", Proceedings of Image Com 90, Bordeaux, France pp 177–182 November 1990. Together with techniques to compress video data, the head was shown to require sufficiently low bandwidth to be able to be demonstrated effectively over Ethernet-type LANs, and also over the Internet. A user can rotate the head in all three dimensions to provide an all-round viewing capability.

To a layman user of the head, the technique appears to be elegantly simple. A user has simply to type in the words he wishes to be spoken as plain text and, after a few seconds delay, the head speaks the words, reproducing the precise lip movements as if a human speaker had spoken the text. To add to the realism, the head blinks at the user as it talks, and its teeth and tongue can also be seen to be moving. Overall the impression is one of a computer generated head speaking as if it were an everyday occurrence, and it can be very convincing. To give an indication of the actual complexity involved, however, one can look at the hardware requirements to run the head effectively. Currently, for example, the head requires a dedicated 3-D graphics multi-processor machine (the Silicon Graphics Onyx) the size of two large filing cabinets to run effectively.

The anticipated uses for a virtual 3-D animated head are many, and the examples given below are certainly not exhaustive. The primary business use for the head is in the field of virtual-conferencing. The bandwidth requirements of such a system are much lower than that required for conventional video-conferencing, even with the use of sophisticated video data compression techniques. By having the software that providies the basic models already installed at both ends of a link, then upon initialisation of a virtual video-conference the only information that will need to be sent is that required to actually conform the head to look like a specific individual. Once this conformation process has been performed, the only data that need be sent over the network is the control information to produce the speech and the animation. Since the control information for the speech generation is plain text, it can be seen that the bandwidth requirements are drastically reduced. The talking head is likely to find application in multi-party virtual-conferences.

The head may also be used as a training tool for people who are hard of hearing. As the lip region of the head may be modelled very accurately, it is possible for a skilled person to lip read the head if necessary. Also, by observing the lip shapes that the head produces for words that the person has typed in, and by then attempting to copy the shapes in front of a mirror, it is proposed that the head may be of value in speech training.

A third use for the head is as an agent interface for on-line services. Science fiction books and films have for decades presented us with the vision of a computer controlled human representation selling us products and services from the comfort of our own homes. Such an agent interface may encompass a broad spectrum of on-line services such as home shopping, booking holidays, negotiating video-on-demand, acting as on-line help for web-based applications etc. The uses of such a virtual human representation are endless. By providing an instantly recognisable image, the head will help to humanise the computer interface, and so make interacting with a system more pleasant.

In the case of a model representing a head, it is necessary for a generic 3-D model to be conformed to the shape and size of the individual to be modelled. This may be a two stage process involving firstly changing the basic shape of the head to match the basic shape of the individual subject concerned and secondly texturing the now conformed head model with appropriate photographs of the individual in order to provide the appropriate detail required for recognition of the textured head image as a specific person. Note that the word "texture" is used here in the specialised sense used in the image-processing art, namely the two-dimensional detail of a portion of a surface element (e.g. the luminance and colour of picture elements), not in the sense of implying a fine three-dimensional structure. The applying of texture (that is, creating an association between a surface element of a 3-D model and a corresponding portion of a 2-D image such that the latter is employed in producing a visual display of the object represented by the model) is referred to as "texturing". The shape conformation can be performed manually or by an automatic process. Such shape conformation is necessary to allow recognition of the modelled head of an individual as the individual it is meant to be. If the head shape is not conformed and a texture map containing the photographs of the individual is simply stretched to fit over the generic model, then odd effects occur and recognition may be lost. The shape must be conformed to represent the same ratios of, for example, head width to height, distance between the eyes to head width etc. for appropriate recognition of the head model as the individual subject.

Following the shape conformation process, the head is textured with appropriate photographs of the subject. This involves taking several photographs of the subject from different aspects i.e. front, side, under chin, back etc. and combining these into a single combined texture map.

As mentioned, known systems allow a user to manipulate the texture map by hand onto the model. When dealing with a 3-D model as complex as a head, however, the time required to texture the model by hand has hitherto been excessive, being heavily labour intensive, and taking anything from two days to more than a week, depending upon the quality of the photographs that were being used as the texture map.

SUMMARY OF THE INVENTION

According to one aspect of the present invention there is provided a method of generating an image representing a three-dimensional object, the three-dimensional object being modelled as a stored set of parameters representing a model of a three-dimensional object and at least two two-dimensional images of the object, each image representing the object from a unique direction of view, the parameters comprising parameters defining the positions of a plurality of vertex points in a virtual space and parameters defining relationships between vertex points and hence surface elements of the object, the method comprising, for a surface element:

determining for the said surface element a measure relative to each direction of view, each said measure being representative of the deviation of the surface of the element from the normal to the direction of view;

identifying the direction of view which exhibits the least said deviation;

identifying within that one of the two-dimensional images which corresponds to the identified direction of view a portion thereof corresponding to a projection of the surface element, whereby the image to be generated may be formed having a shape determined by the stored parameters and having surface detail determined by the two-dimensional images.

Preferably, the allocation of surface elements to directions of view is, for selected ones of the elements, predefined and the steps of determining and identifying are carried out only for the remaining surface elements.

The measure may be determined by:

finding the co-ordinates of the vertices of the surface element with respect to a co-ordinate system corresponding to the directions of view;

determining the maximum difference in the co-ordinates in each of the directions of view;

forming ratios of the maximum differences with respect to each direction of view.

Alternatively, the measure may be determined by:

finding the co-ordinates of the vertices of the surface element with respect to a co-ordinate system corresponding to the directions of view;

ascertaining the dimensions of a polyhedron, the faces of which are normal to the respective directions of view and which encloses the vertices of the surface element;

calculating the length of each side of the polyhedron in each direction of view; and forming ratios of each length with respect to each direction of view.

In another aspect, the invention provides a method of generating an image representing a three-dimensional object, the three-dimensional object being modelled as a stored set, of parameters representing a model of a three-dimensional object and at least two two-dimensional images of the object, each image representing the object from a unique direction of view, the parameters comprising parameters defining the positions of a plurality of vertex points in a virtual space and parameters defining relationships between vertex points and hence surface elements of the object, the method comprising, for a vertex:

identifying those vertices which, together with the said vertex, contribute to representing surface elements which include the said vertex;

determining for the said surface elements a measure relative to each direction of view, each said measure being representative of the deviation of the surfaces of the elements from the normal to the direction of view;

identifying the direction of view which exhibits the least said deviation;

identifying within that one of the two-dimensional images which corresponds to the identified direction of view a portion thereof corresponding to a projection of the surface element, whereby the image to be generated may be formed having a shape determined by the stored parameters and having surface detail determined by the two-dimensional images.

These methods may include the step of adjusting brightness and/or colour values of the surface detail to be applied, such as to reduce discontinuities between a surface element in respect of which one direction of view has been identified and a surface element in repect of which another direction of view has been identified. For example, the adjusting step may comprise:

(a) comparing, for surface elements represented in two or more of said two-dimensional images, brightness and/or colour values of of the surface detail of those elements as represented in the two-dimensional images, and adjusting the values from at least one image in a sense such to reduce the extent to which they differ: and (b) performing further such adjustments such as to reduce discontiuities between a surface element in respect of which one direction of view has been identified and a immediately adjacent surface element in repect of which another direction of view has been identified.

In yet another aspect of the invention, there is provided an apparatus for generating an image representing a three-dimensional object, comprising:

a store (1) for storing a set of parameters representing a model of a three-dimensional object and at least two two-dimensional images of the object, each image representing the object from a unique direction of view, the parameters comprising parameters defining the positions of a plurality of vertex points in a virtual space and parameters defining relationships between vertex points and hence surface elements of the object; and control means arranged in operation to determine for a surface element a measure relative to each direction of view, each said measure being representative of the deviation of the surface of the element from the normal to the direction of view;

to identify the direction of view which exhibits the least said deviation; and to identify, within that one of the two-dimensional images which corresponds to the identified direction of view a portion thereof corresponding to a projection of the surface element, whereby the image to be generated may be formed having a shape determined by the stored parameters and having surface detail determined by the two-dimensional images.

In a further aspect, there is provided an apparatus for generating an image representing a three-dimensional object, comprising:

a store for storing a set of parameters representing a model of a three-dimensional object and at least two two-dimensional images of the object, each image representing the object from a unique direction of view, the parameters comprising parameters defining the positions of a plurality of vertex points in a virtual space and parameters defining relationships between vertex points and hence surface elements of the object; and control means arranged in operation to identify those vertices which, together with the said vertex, contribute to representing a surface element which includes the said vertex;

to determine for the said surface elements a measure relative to each direction of view, each said measure being representative of the deviation of the surfaces of the elements from the normal to the direction of view;

to identify the direction of view which exhibits the least said deviation; and identify within that one of the two-dimensional images which corresponds to the identified direction of view a portion thereof corresponding to a projection of the surface element, whereby the image to be generated may be formed having a shape determined by the stored parameters and having surface detail determined by the two-dimensional images.

An additional aspect of the invention concerns a method of generating an image representing a three-dimensional object, the three-dimensional object being modelled as a stored set of parameters representing a model of a three-dimensional object and at least two two-dimensional images of the object, each image representing the object from a unique direction of view, the parameters comprising parameters defining the positions of a plurality of vertex points in a virtual space and parameters defining relationships between vertex points and hence surface elements of the object, the method including the generation of an image representation in which the surface detail of each surface element is obtained from one of the said two-dimensional images, and including the step of adjusting brightness and/or colour values of the surface detail to be applied, such as to reduce discontinuities between a surface element in respect of which one direction of view has been identified and a surface element in repect of which another direction of view has been identified.

BRIEF DESCRIPTION OF THE INVENTION

The invention will now be described, by way of example only with reference to the accompany drawings, in which.

DETAILED DESCRIPTION OF THE EXEMPLARY EMBODIMENTS

Figure 13:
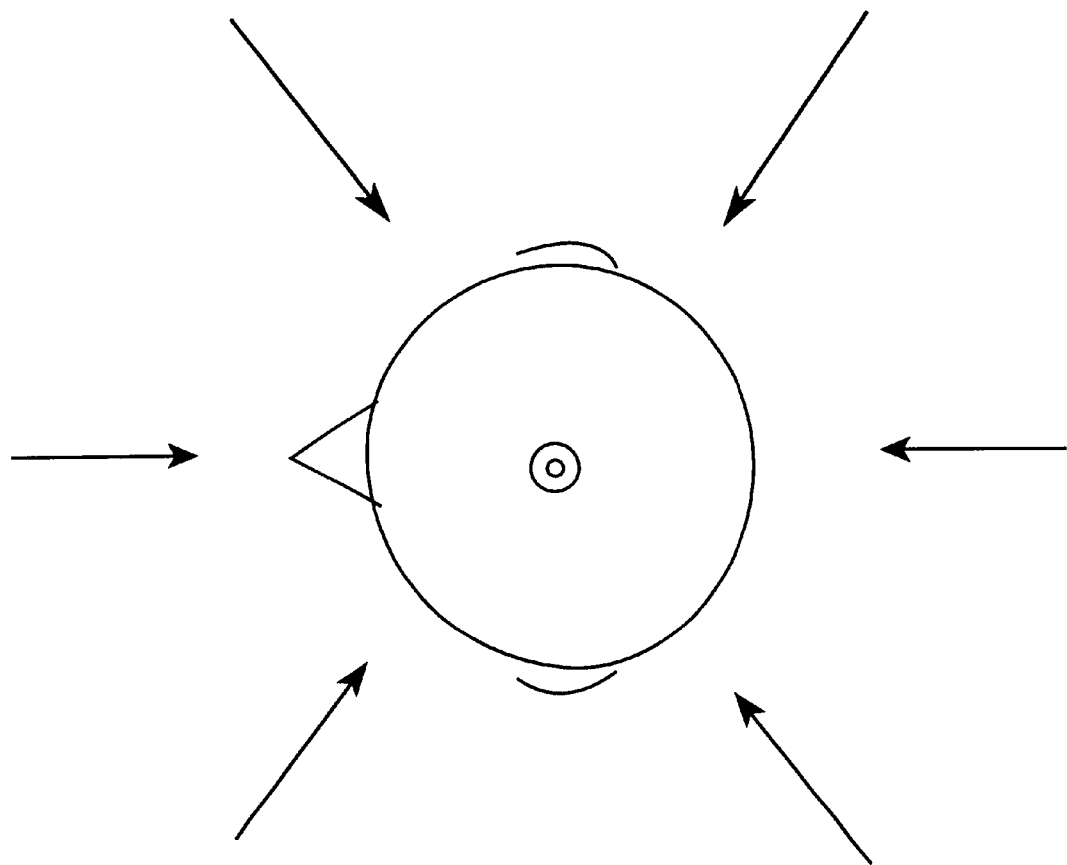

FIG. 13 shows an alternative co-ordinate system.

The purpose of the system to be described is to generate a synthetic two-dimensional display of a head, so that the image seen in the display appears as seen from any desired viewpoint, or a sequence of such images so as to provide animation. The system is based on a so-called wire frame model, which is adapted to resemble a particular real—or imaginary—person. To give an overview, this is achieved by:

(A) the provision of a standard or generic wire frame model having a set of points defining the vertices of polygonal facets of the model which has a basic default shape;

(B) changing this shape to match the shape of the person to be represented;

(C) defining the appearance of the individual facets by reference to a "texture map" containing two-dimensional information as to the appearance of the person when viewed from each of a number of fixed directions;

(D) using the "customised" head definition thus created to generate, in response to control information specifying a desired viewpoint or—for animation—a sequence of such viewpoints, a signal for supply to a display device. If desired, such animation may include animation of the mouth to accompany the generation of synthetic speech, for example using a text-to-speech synthesiser and providing sequences of mouth shapes ("visemes") along with the phonemes of the speech.

Steps (A), (B) and (D) are conventional, and the major part of the following description will, therefore, be devoted to the details of Step (C).

Figure 1:
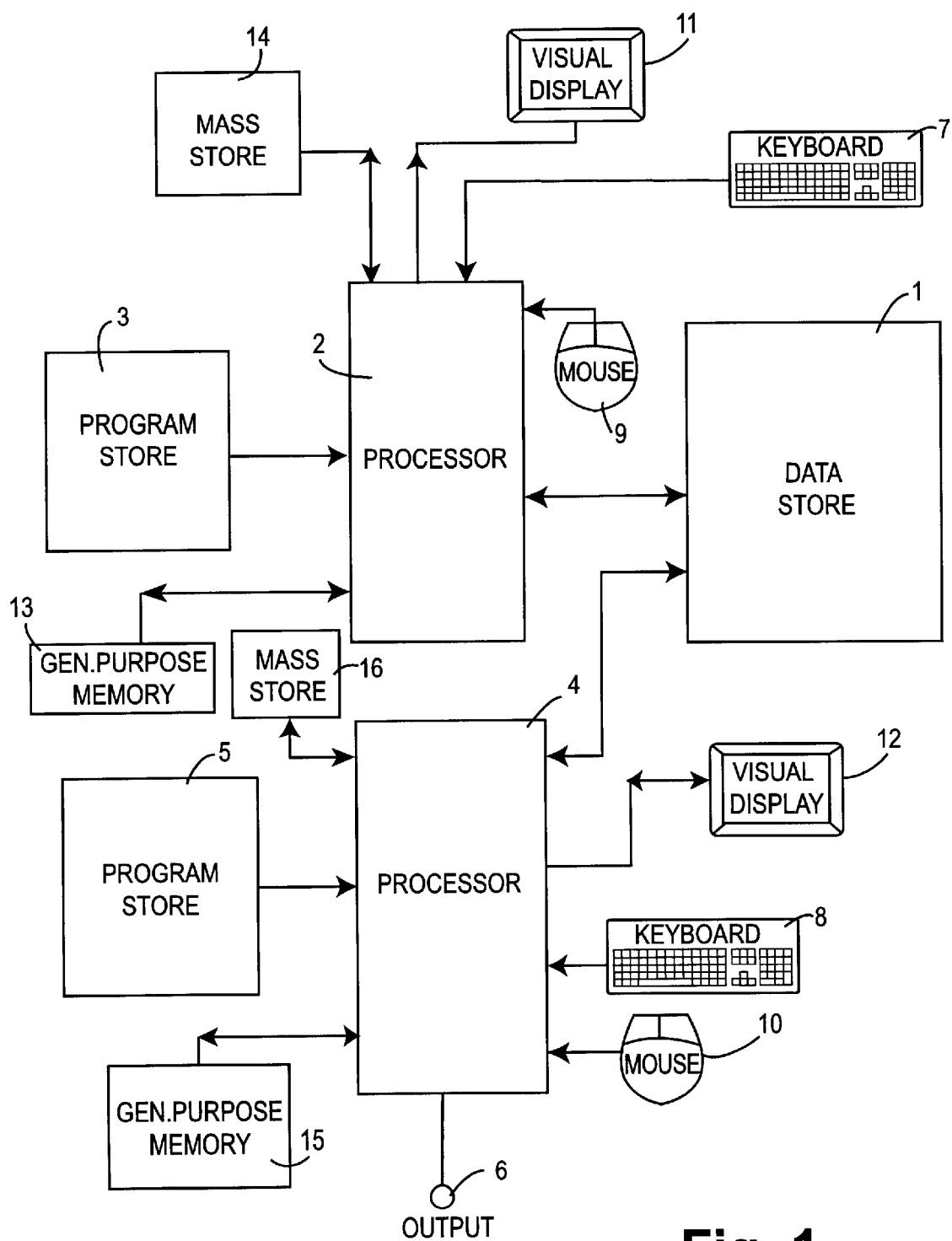
FIG. 1 is a block diagram of one form of apparatus according to the present invention.

FIG. 1 shows a suitable apparatus which has a store 1 for containing all the data defining the head. A first processing device 2 has access to the store 1 and also to a second store 3 containing programs for operating the processing device 2 so as to perform steps A, B and C. A second processing device 4, with its own program store 5, serves to perform step (D), providing at an output 6 digitally coded images, or a video signal, for driving, directly or after storage and/or transmission, a visual display device (not shown). This step could of course be performed in an entirely separate apparatus, consisting of the processor 4, store 5, output 6 and a duplicate of the store 1. The processors 2, 4 have conventional input/output arrangements for operator control, typically a keyboard 7, 8, mouse 9,10 and visual display 11, 12. The processor 2 has general purpose memory 13; references below to the generation of arrays refer to storage in this memory.

Mass storage 14 such as a disk drive is provided and references to the storage of files refer to storage here. The processor 4 is similarly provided with memory and storage 15,16.

Figure 2:
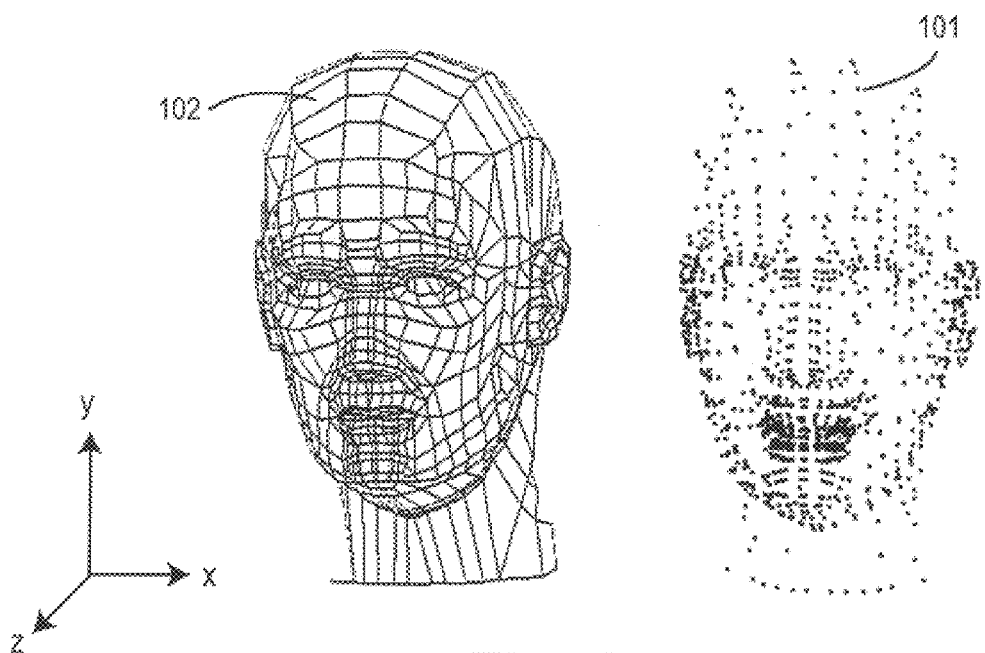
FIG. 2 shows an example of a visual 3-D model representing a head and the vertices of such a model.

FIG. 2 shows an example of a three-dimensional wire frame model for a head and the vertices of such a model. The co-ordinate system of the model is also shown. The 3-D model is composed of a number of discrete vertices 101, defined by co-ordinates in 3-D virtual space, together with the information to join the vertices up into the right order to produce individual surface elements or polygons 102 that combine to give the impression of a 3-D surface. Although triangles are necessarily planar, quadrilaterals and higher order polygons are not necessarily planar. The methods to be described can accommodate non-planar polygons without requiring modification, even though in such a case the notion of a gradient is only an approximation. The (conventional) texturing process considers non-planar polygons to be composed of a number of triangles.

This information, along with a definition of the co-ordinate system of the model, is stored in the database 1. As can be seen from FIG. 2, the head model may be considered as a plurality of discrete points 101 that form the vertices of polygons 102. The actual polygons 102 themselves may be considered a secondary product of the vertices, being formed as a result of simply joining up the vertices in a defined manner. Alternatively, the polygons may be thought of as elements in their own right, defined by co-ordinates in 3-D virtual space.

The conventional parts of the process are, in this example, implemented using a set of software tools from Silicon Graphics Inc. known by the trade marks Open Inventor, and IRIS Performer. More specifically, Open Inventor is used to develop viseme models and to conform the head off-line, while Performer is a real-time software suite used to perform animation of the head. Both Open Inventor and Performer are based upon the C++ programming language, and provide ways to create interactive 3-D graphics applications. The system of FIG. 1 uses Open Inventor to perform tasks A-C, and the database 1 therefore uses the same data structures. The reader should, however, be aware that Performer is used to actually run the Talking head (Step (D)).

Open Inventor is an object-oriented 3D toolkit. It contains a library of objects and methods that enable the user to take advantage of the powerful graphics hardware of Silicon Graphics workstations with minimal programming effort. Based upon the Silicon Graphics OpenGL graphics library, Open Inventor provides a suitable set of design methodologies and appropriate libraries needed to produce impressive 3D graphics applications.

Open Inventor focuses on creating 3D objects, where all the information about these objects such as size, shape, colour, surface texture, location and orientation in 3D space, how light reflects off it etc., are stored in a scene database. In this manner, by specifying the properties for every object, whole 3D virtual worlds can be easily implemented.

The database is made up of a number of parts, called nodes, a node being the basic building block of an Open Inventor database. Each node holds a specific piece or pieces of information, the information it contains depending upon the type of node it is.

The first node is a SoCoordinate3 node, and contains a list of the co-ordinates of all the vertices that are used within the model.

The next node is the SoIndexedFaceSet node, which contains multiple value fields containing the information required to essentially 'join-the-dots' of the vertices up in the right order to produce the required shape from polygonal faces. This particular object is indexed, and so each vertex co-ordinate is entered into the co-ordinate list once only. The SoIndexedFaceSet node has a field known as coordIndex which contains the instructions on how to join the vertices up to form polygons, in the form of a list of indices into the co-ordinate list. So, if for example, one wished to create a four sided polygon with its vertices at the co-ordinates represented by the values held at positions 1, 4, 5 and 7 in the co-ordinate list, what is required is that within the coordindex field of the SoIndexedFaceSet node would be an entry 1, 4, 5, 7, −1 the −1 specifying that this is the end of the polygon definition. By defining every polygon in this manner, the shape of the object can be built up.

Other nodes may contain further information about how the various parts of the object are to be displayed (such as reflectivity to incident light) but are not relevant for the purposes of the present discussion. The nodes contain all the information required to render a model—that is, to create a two-dimensional display of the object represented by the model, as seen from a desired viewpoint.

Figure 3A:
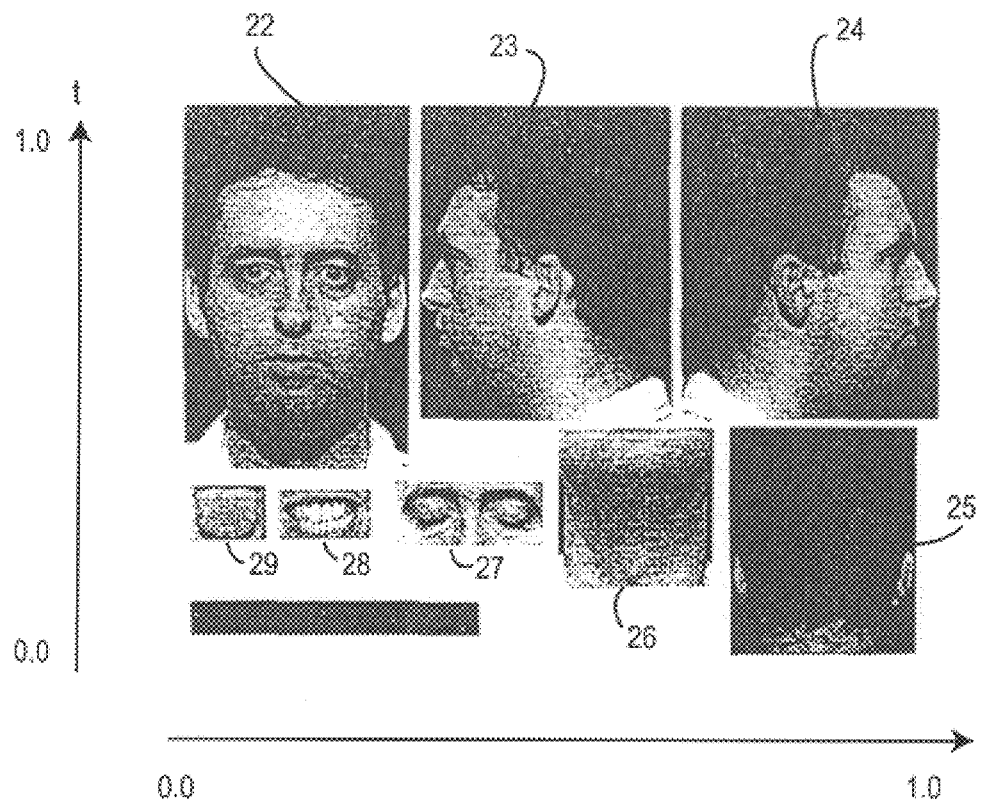
FIGS. 3a and 3b show examples of a texture map used to texture the model of FIG. 1.
Figure 3B:
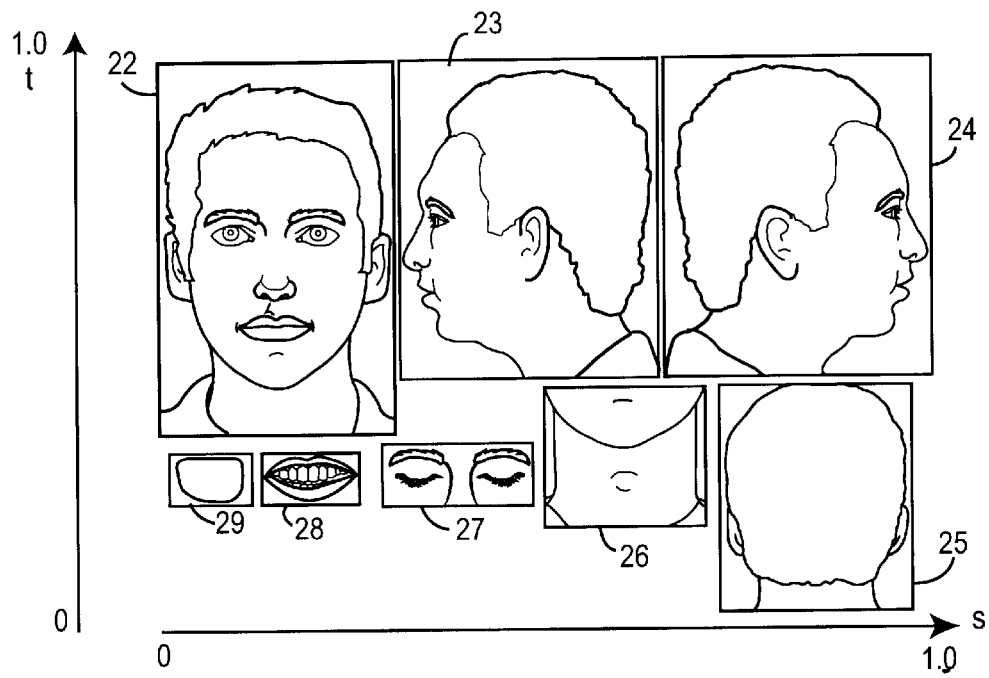

FIGS. 3a and 3b show an example of texture maps used to texture the head model. This is a single two-dimensional bitmap image with co-ordinate axes s and t, and contains a number of different two-dimensional views of the object.

FIG. 3a shows eight photographs taken of a person to be modelled. The photographs comprise a front view 22, a left-hand side view 23, a right-hand side view 24, a back view 25, an under-the-chin view 26, a closed eye view 27, an open mouth view 28 and a protruding tongue view 29. Note that the under-the-chin view is used for the "view from beneath" referred to later in this description. The photographs are combined into a single combined texture map. FIG. 3b shows an example of eight hand-generated images (corresponding to the photographs of FIG. 3a) which may alternatively be used to texture the image. It will be appreciated that it is preferable to use photographic images of an object to be represented since these will bear a closer resemblance to the actual object than hand drawn likenesses. The texture map is created manually and is stored as an image file, referenced by the database.

In this example, the two coordinate axes of the texture map are parallel to two of the coordinate axes of the head model (which two, varies of course according to which of the views in the texture map one is considering); this is not actually essential but of course it simplifies the mathematics somewhat.

Step (A) above is conventional and consists simply of initial loading of a standard set of parameters into the nodes SoCoordinate3 and SoIndexFaceSet in the database. Step (B) of conforming the head shape to a desired shape is conventional and will not therefore be described in detail.

The necessity for Step (C) arises because, when Step (D) is performed, it involves (inter alia) texturing, that is, determining the luminance and colour of each picture element (pixel) of the final image by projecting, in the viewing direction, the appearance of each facet or polygon of the model. To find the appearance of the polygon, it is necessary to project the pixels of one of the views of the texture map onto the polygon. Consequently, the processor 4 requires for each polygon a set of data which defines the correspondence between each vertex and a corresponding point in the texture map so as to define a polygon on the texture map; the projection of the map onto the facet then is simply distorting or transforming the pixel data from the polygon of the texture map to fit the polygon of the facet. Step (D) thus serves to generate this texture mapping data.

It is important to choose, for texturing of a facet, the appropriate view in the texture map; in particular, use of a view in which the facet under consideration is seen very obliquely is inappropriate as it results in a stretching of a small number of pixels over a relatively large area and is perceived as a scarring effect in the final displayed image. Therefore Step (C) falls into two parts: determining the appropriate view, and mapping the actual coordinates. This determination is based on the angles or gradients of the polygons. Consider for the purposes of illustration, a two-dimensional example, as shown in FIG. 4(A), where a surface element 30 under consideration lies parallel to the z-axis and has projections Δy on the y-axis and Δx on the x-axis. Δx and Δy have the same value, and hence the ratio of the two is one. When a pixel is projected onto the surface from either the x or the y direction, the area it covers is the same. For a pixel of unit size i.e. 1 by 1, the area covered on the surface from a projection in either direction must be √2 square units, for this 2-D situation. Since the ratio is one, the surface element 30 may be textured from either the x or the y direction. The threshold of 1 occurs because the switch between photographs of perpendicular views is at 45 degrees. The method could be used with additional photographs not of perpendicular views. The viewing angles would need to be known and hence the thresholds could be calculated.

Now consider the situation depicted in FIG. 4(B), where Δy is much larger than Δx, and hence the ratio Δy/Δx is greater than one. In this case the projection of a unit pixel from the x direction will cover more than one square unit but less than √2, whereas the projection of a pixel from the y direction will cover an area far greater than √2 square units. For maximum resolution, therefore, the projection must come from the x direction.

The opposite is true in FIG. 4(C). Here, Δy is much less than Δx, and so the ratio of the two will be less than 1. A projection of a unit pixel from the y direction, while still covering more than one square unit, will cover less than √2 square units on the surface, whereas a projection from the y direction will cover far more than √2 square units. For maximum resolution the projection should be from the y direction.

Figure 4:
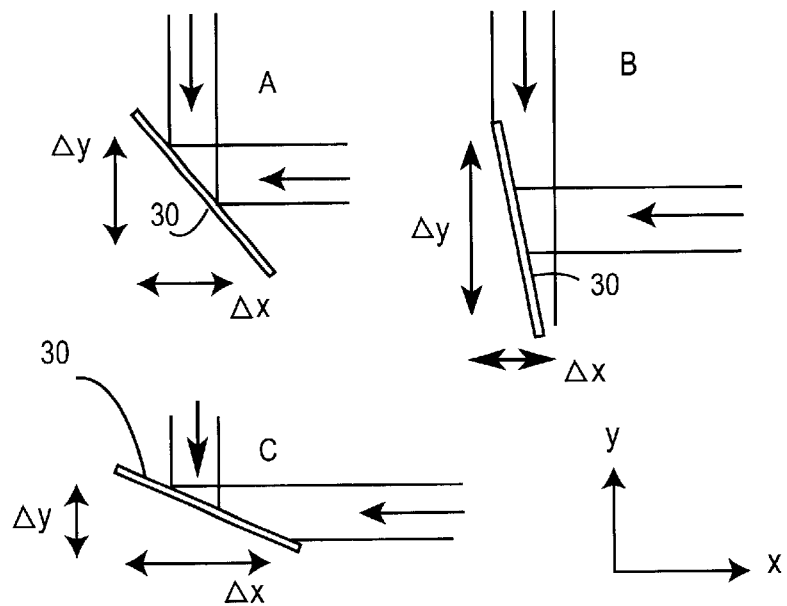
FIG. 4 shows examples of different delta values.

To summarise (noting that it is the modulus of Δx and Δy that is significant, the sign being ignored), the conditions for FIG. 4 are:

$$\text{If } \left|\frac{\Delta x}{\Delta y}\right| > 1 \text{ then texture from the } y\text{-direction}$$

Otherwise, texture from the x-direction

This theory is extended (see below) to cover 3-D surfaces. The extra dimension, however, may lead to the further problem of from which side the projection is now to be made e.g. whether the projection comes from the positive x or the negative x direction. The solution to this problem is described below.

The explicit conditions that must be used depend upon the orientation of the head with respect to the co-ordinate axes i.e. in which plane does the face, the top, the side etc. lie. Given that the head when used within Open Inventor based applications has a right-handed co-ordinate system as described previously and shown in FIG. 2, it can be seen that the following statements apply:

The front of the face extends primarily in the x-y plane and should therefore be textured from z-direction view.

The left-side of the head extends primarily in the y-z plane and should be textured from an x-direction view.

The right-side of the head extends primarily in the y-z plane and should be textured from an x-direction view.

The back of the head extends primarily in the x-y plane and should be textured from a z-direction view.

The top of the head extends primarily in the x-z plane and should be textured from a y-direction view.

The chin extends primarily in the x-z plane and should be textured from a y-direction view.

From these statements it can be seen that both the front and back views require texturing from the z-direction, but obviously each require different textures to be applied. For example, consider the gradients that arise in each direction from a point on the right cheekbone. The gradient values may be identical to a point at the bottom-left of the back of the head. These gradient values will be able to tell one that the point belongs to the front or the back of the head, but will not be able to discriminate as to from which photograph the point should be textured. For this more information is required.

Considering the differences between the front and the back of the head; quite clearly they are at different places in virtual space. Were the origin of the co-ordinate system to be also the centre of the head model, then points 101 on the front of the head would have a positive z value, whereas points 101 on the back would have a negative z value. This may not be a valid assumption, however, especially after the head model has been through the shape conformance program. A more general approach would be to take the z value of a vector from a point at the centre of the head to the point or points in question. If this value is positive then the points in question lie within the front facial region; if negative, then they lie within the back head region.

Various methods for finding a point to be considered as the centroid of the model may be used. For instance the centroid of the model may be considered to be point where the sum of the Euclidean distances to all the vertices that make up the head is a minimum. By definition, this point must then lie somewhere within the head volume, towards the centre of the head.

An alternative method, considered to be the simplest, involves taking the x, y and z values from all the co-ordinates, sorting them by value into three lists in ascending (or descending) order, and then taking the median value from each list as the co-ordinates of the point at the centre of the head. As the unconformed head model is symmetrical from left side to right side, the x-value thus gained should lie on a plane splitting the head in two. The y- and z- values could not be guaranteed to be as precise, but should be in the environs of the centre of the head.

Another alternative involves finding the centroid of the head, the centroid being the point with co-ordinates that are the mean values of all the other co-ordinates. Hence, all the x-, y-, and z- co-ordinate values are added up to give three values for the sum of all the x co-ordinates, all the y co-ordinates, and all the z co-ordinates, and then the sums are divided by the number of vertices to give the mean. This approach guarantees that the point found must lie within the head volume, and be close to the exact centre. The only drawback with the technique is that it is highly susceptible to being affected by large numbers of vertices in the same region of the head. Thus it is found that the centroid point actually produced for a head model is weighted towards the front of the head, due to the large number of polygons used to construct the face with respect to the relatively few used for the back of the head. The point is still sufficiently close to the centre, however, for it to be used effectively.

With the extra information about the relative position of the point or points in question with respect to the centre of the head, together with appropriate gradient information, the view to be used for texturing at a point or set of points on the head can be adequately determined.

Extending the illustrative condition for two dimensions to three, and including the above discrimination as between front and back and so on, we have:

$$\text{If } \left|\frac{\Delta x}{\Delta z}\right| > 1 \text{ AND } \left|\frac{\Delta y}{\Delta z}\right| > 1 \text{ AND}$$

$$\Delta z_{centroid\ to\ point} > 0 \text{ THEN texture from front}$$

$$\text{If } \left|\frac{\Delta x}{\Delta z}\right| > 1 \text{ AND } \left|\frac{\Delta y}{\Delta z}\right| > 1 \text{ AND}$$

$$\Delta z_{centroid\ to\ point} \leq 0 \text{ THEN texture from back}$$

$$\text{If } \left|\frac{\Delta z}{\Delta y}\right| > 1 \text{ AND } \left|\frac{\Delta x}{\Delta y}\right| > 1 \text{ AND}$$

$$\Delta y_{centroid\ to\ point} > 0 \text{ THEN texture from top}$$

$$\text{If } \left|\frac{\Delta z}{\Delta y}\right| > 1 \text{ AND } \left|\frac{\Delta x}{\Delta y}\right| > 1 \text{ AND}$$

$$\Delta y_{centroid\ to\ point} \leq 0 \text{ THEN texture from beneath}$$

Otherwise,
If $\Delta x_{centroid\ to\ point} > 0$ THEN texture from right
If $\Delta x_{centroid\ to\ point} \leq 0$ THEN texture from left The conditions for texturing from the top included for completeness: where (as here) one or more views (in this case the top) is unavailable, then the relevant condition should be omitted. The sequence of tests may be chosen so that a suitable default is reached (in this cases, the right and left views).

The above expressions are used when different images from opposite directions are involved. However, if images are only taken, for example, from the front, left side and top (the back, right side and bottom being identical to the front, left side and top respectively) it is not necessary to include the condition to discriminate between a positive and negative direction.

It remains to be explained how the delta values $\Delta x$, $\Delta y$ and $\Delta \Delta z$ are actually obtained.

As can be seen in FIG. 2 the 3-D model may be considered as a plurality of discrete points 101 that form the vertices of the polygons 102. In one embodiment of the invention, the actual polygons 102 themselves may be considered as secondary to the points 101, being formed as a result of simply joining up the points 101 in the correct manner, as specified in the database.

Thus, by searching systematically through the head model point by point, in the order in which the points 101 are presented within the database, suitable delta values are generated for each point. These values are then used in the manner described earlier to give the gradients at the point and subsequently to decide where on the head the point is. With this method, every point is guaranteed to be processed and to receive a marking as to which region of the head it is in and hence which photograph of the subject it should be textured from. The boundaries between regions are not explicitly searched for, but rather arise as a result of all the points within them being marked as such.

Connectivity information of an indexed set of vertices is stored in the database 1 in the form of a list of indices that reference into the co-ordinate list, each polygon being described by a list of the co-ordinate indices in the order in which the vertices are to be joined up, terminated by –1. The information regarding which point is next to which is, therefore, held explicitly within an indexed face set, and this is used to find the surrounding polygons to a current point under consideration. First, the index of the current point is found by searching through the co-ordinate list SoCoordinate3 and matching the co-ordinate values. Once this index is found, the index list within the SoIndexedFaceSet node is searched for the current point's index and, once found, the surrounding points' indices are the values above and below the current index in the list. Once these index values have been found, the appropriate vertex coordinates needed to find the delta values may be read.

Figure 5:
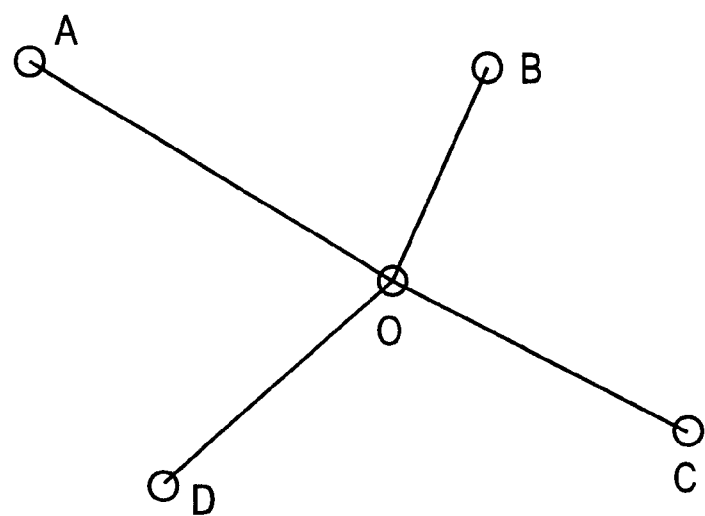
FIG. 5 show a point under consideration and the four points with which it is defined as being interconnected.

An example is depicted in FIG. 5. Thus for a particular point O under consideration, deltas exist in the x, y, and z directions between O and all the other points i.e. three deltas exist for each point, and suitable gradients with respect to all three axes may be found for each line connecting O with the subordinate points A, B, C or D. the delta method. In this manner, those points which one can say definitely need texturing from a particular direction are dealt with separately from all the other points.

These volumes are preferably defined for the generic head model, and marking of points for exemption purposes is performed before the head shape is subjected to the conforming process. This is to avoid having to redefine the volumes for a new shape, or points being displaced by the conforming program into the wrong volume. The procedure need only be undertaken once for each 3-D model, as once the lists are generated they are valid for any conformed head from then on.

Figure 10:
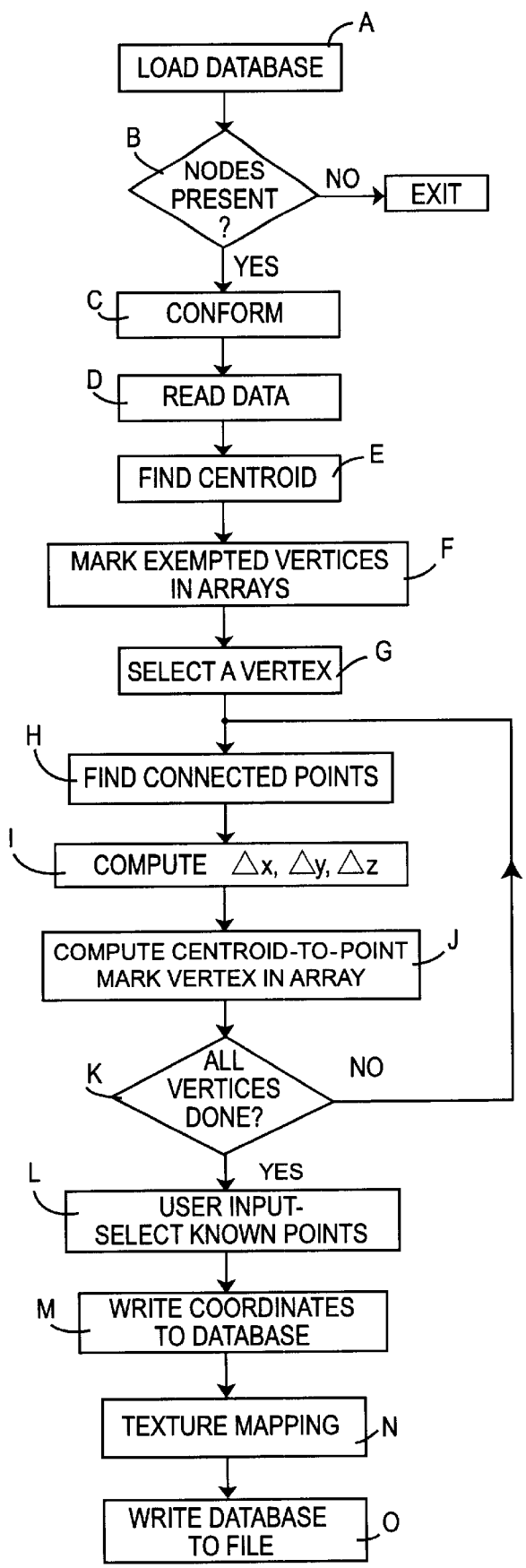
FIGS. 10 and 12 are flowcharts showing operation of the process of FIG. 1.

Thus the full operation carried out to texture a 3-D model on a point-by-point basis is shown in the flowchart of FIG. 10, and proceeds as follows:

1. Load the Open Inventor database.
2. Check the database for SoCoordinate3 node and SoIndexedFaceSet node—exit if not found.
3. Conform the head to the desired shape.
4. Read the head co-ordinates and indices into head_coords array and vertex_index array respectively. Also get a count of each and store them.
5. From the head vertex co-ordinates, calculate the centroid of the model.
6. For each point in the model, ascertain by reference to the list discussed above if it lies within any of the predefined volumes. If so write the index of the point into the appropriate array. Six arrays were defined for each different photograph that was to be used as a texture map, i.e. front_head_index, chin_head_index, back_head_index, left_head_index, right_head_index, top_head_index arrays. These arrays contain the index of the points that are to be textured from a particular aspect. When a point is said to have been 'marked' as to its texture, within this description this means that its index has been written into one of these arrays.
7. Those points not marked by the volumes are now eligible for processing using the delta method. For every point in the model, see if it has already been However, finding such gradients of connecting lines tells one nothing about the orientation of the surfaces upon which the points lie. All that has been found is a line that lies on the surface, not the surface itself. In order to consider a surface, at least three points must be considered simultaneously, to give (for three points) a triangular plane surface or a polygonal surface having more than three sides. As noted earlier, in the determining of deltas for polygons we are in effect determining the gradient of the bounding box around the polygon—so this is only an approximation to the gradient of the surface.

Figure 6:
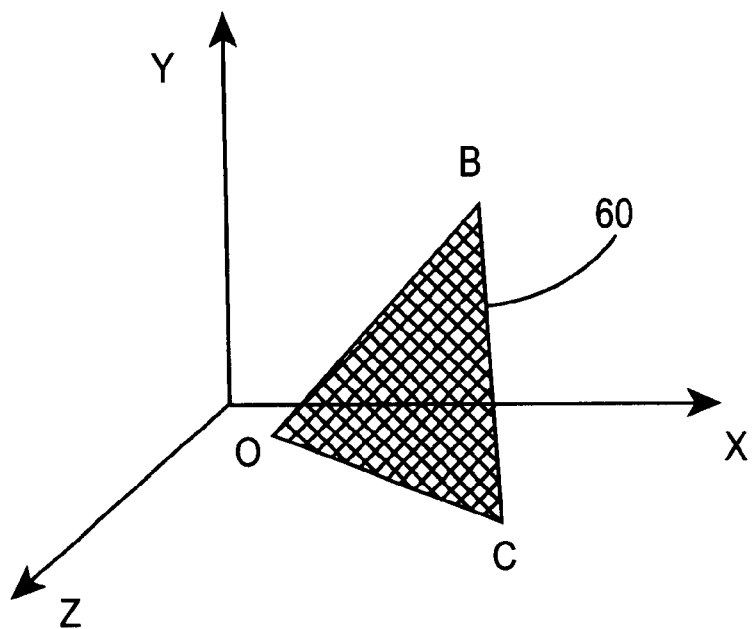
FIG. 6 shows a triangular plane with vertices of points O, B and C of FIG. 5.
Figure 7:
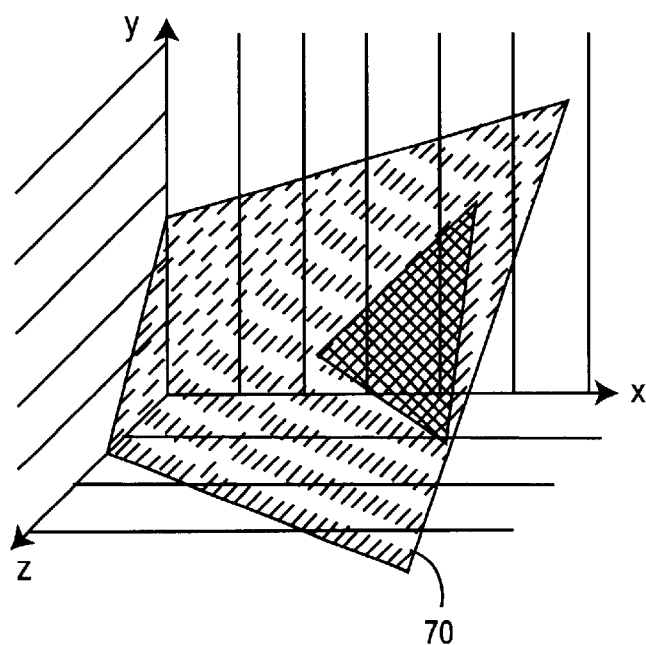
FIG. 7 shows the triangular plane of FIG. 6 extended to intersect with the co-ordinate axes.

Consider the triangle formed by connecting up O, B, and C of FIG. 5. This triangle 60 (shown in FIG. 6) has gradients in each direction that belong to the surface rather than a line on the surface, and these gradients correspond to the gradients of the lines formed when the plane of the triangle cuts the coordinate planes. FIG. 7 shows at 70 the plane extended to intersect the co-ordinate planes.

By finding the gradient of the line formed at the intersection of the plane containing points OBC and each of the coordinate planes, the gradients $\Delta x/\Delta y$ etc. for the triangular surface can be found. Such triangular surfaces can be formed from the point O and the surrounding points A, B, C, or D. This method may then be used for each triangle thus formed and a mean gradient value found for the point O in each direction from these individual triangle plane gradients.

Figure 8:
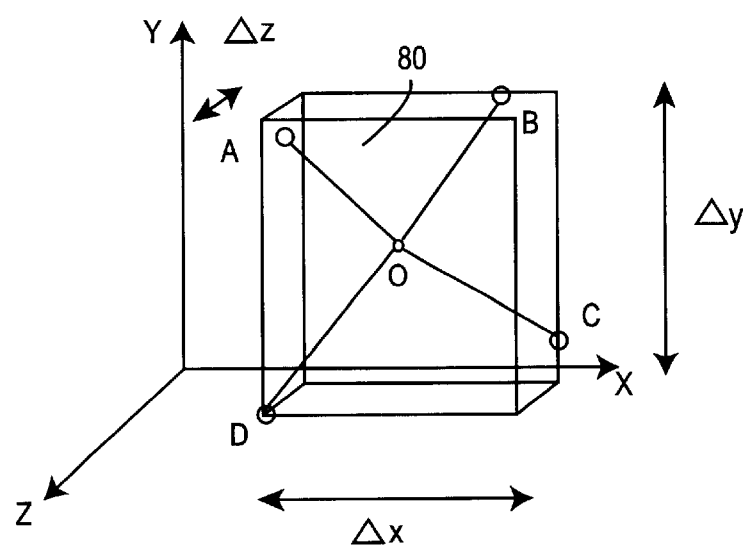
FIG. 8 shows a parallelepiped, the surfaces of which are determined by the points of FIG. 5.

Alternatively, a more simple method of extracting the delta values involves finding the parallelepiped or bounding box of the current point and all the surrounding points (or, more generally for the case of a non-rectangular direction of view system, with faces normal to the directions of view). FIG. 8 illustrates the bounding box 80 for the points of FIG. 5. Having found the surrounding points in the same manner as before, the x, y and z values of all the co-ordinates found are sorted into order, to give the highest and lowest values of the set in each of the directions. These highest and lowest values define the bounding box of the data set. Thus the bounding box 80 represents the smallest volume box having sides parallel to the coordinate x, y and z axes which encloses all of the points under consideration.

Note how the bounding box is oriented with the axes. This is important for finding the correct delta values. The delta values for the point in question O are the dimensions of the bounding box, as shown. These measures are used in the boundary logic conditions described previously, which in effect measure the aspect ratio of length-to-breadth-to-height of the bounding box 80 to decide which way the bounding box, and hence the surface, is facing. For example if, as in FIG. 8, the values $\Delta x$ and $\Delta y$ are bigger than $\Delta z$, or to be more precise, the gradients $|\Delta x/\Delta z|>1$ AND $|\Delta y/\Delta z|>1$, then the point O under consideration should be textured from either the positive or negative z-direction. The decision as to the positive or negative direction depends on the appropriate value of the point under consideration to the centroid of the model, as discussed earlier.

A further consideration to be taken into account is that there may be some local regions on the head model that should be exempt from the delta determination method, if the correct marking is to be given to them. Such regions will lie mainly within features of the head, such as the eyes, lips, ears, nose, etc., where the features have been finely modelled and result in the points 'facing' a different direction to that from where one would wish the point to be textured from. For example, consider a point on the side of the nose. It will actually face more to the side than to the front, yet it needs texturing from the front, the same as the rest of the face. This is due to practical issues relating to different lighting, colour, and luminance between the photographs, as well as positional alignment, so that one prefers to minimise the number of switches between photographs. Similarly, a point within the ear may face more to the front than to the side, but requires texturing from the appropriate side photograph.

Figure 9:
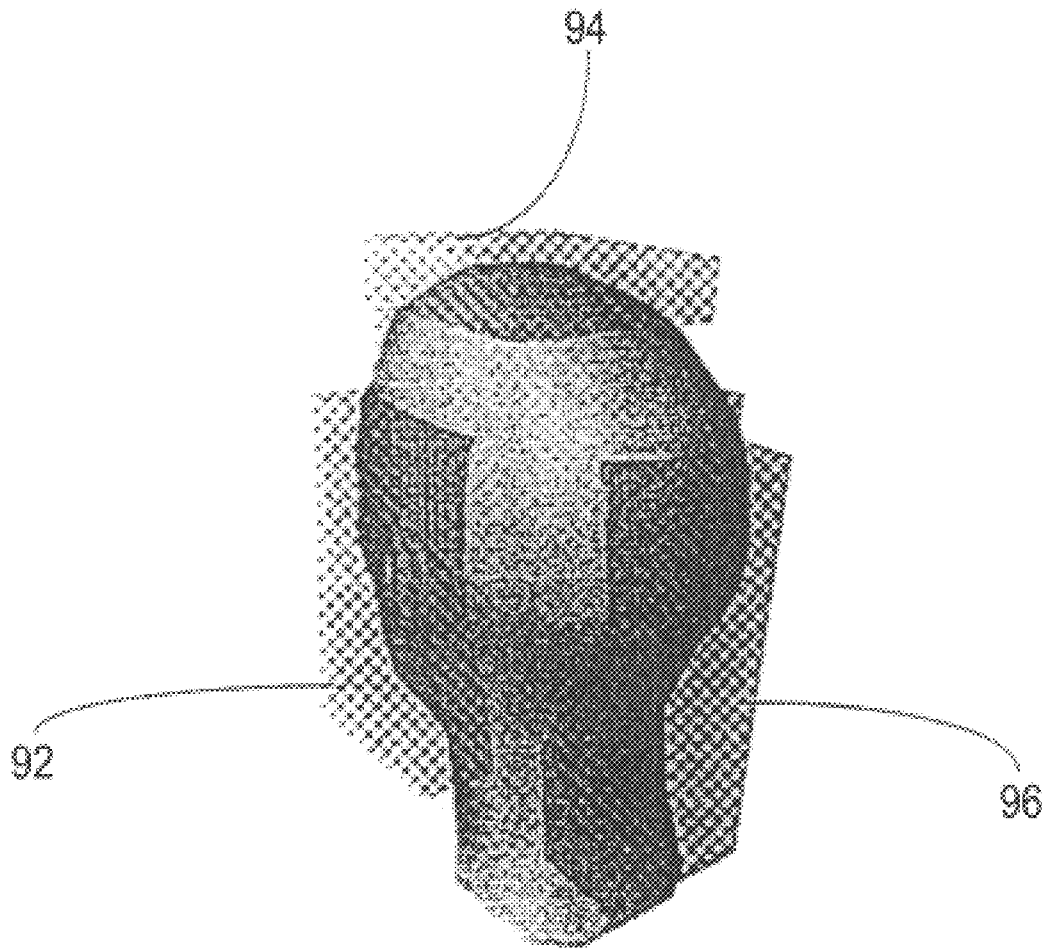
FIG. 9 shows pre-determined volumes of the head model to which, in one embodiment of the invention, the method of the invention is not applied.

This exemption is achieved by defining several volumes on the head model, inside of which any points are given a default marking. Several different volumes may be defined, some of which overlap and lead to points being given the same mark, others separate and leading to points being given a different mark. An example of three pre-defined volumes 92, 94, 96 is shown in FIG. 9.

The comparison as to whether a point lies in a volume may be performed by looking at the co-ordinates of the point in 3-D space. By knowing the maximum and minimum values in each direction of each of the volumes, then if all the point's co-ordinates lie within these ranges, it must be within the volume. By checking each point against each volume in turn, the specific marking can be obtained. Once a point has been given a marking from this method, it is not then processed using assigned to one of the _head_index arrays, and if so go on to the next point. If not process using delta method.

Figure 11:
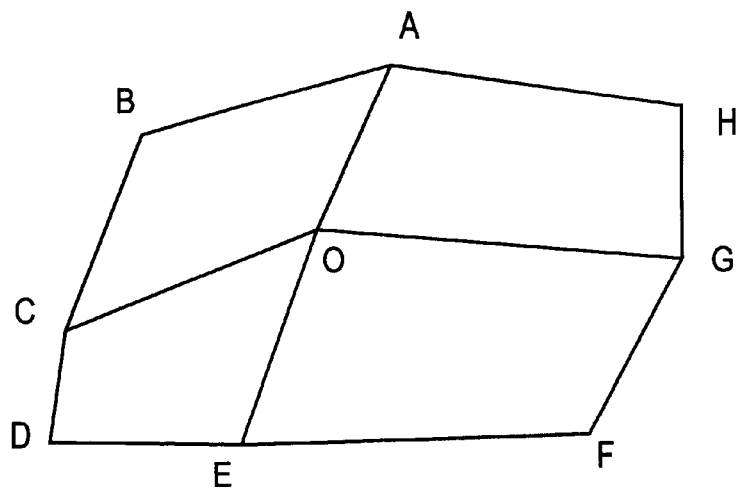
FIG. 11 shows an example of all the other points in all the polygons of which the current point is a member.

To use the delta method,

Step H. Find the connecting points by searching through the index list SoIndexedFaceSet for the index of the current point. Once found, search upwards through the list writing each index into a connected_points array, until −1 (the end of polygon flag used in Open Inventor) is encountered. Go back to the point where the current point's index was found and search downwards, writing the indices into the connected_points array until another −1 is encountered. Repeat until no further instances of the current point are found. This method effectively finds the points shown in FIG. 11. i.e. it finds all the other points in all the polygons of which the current point is a member. This is more information than is necessarily required by the theoretical method outlined previously, which suggested that only the points which connect directly to the current point O may be used but, by effectively finding the four polygons, a more accurate description of the surface on which the point O lies may be found.

Step I. Having found these points, the x-, y-, and z-co-ordinates of each point in the connected_points array is found and each is put in one of three arrays with the corresponding values of all the other points in the connected points array. These arrays containing the x-, y-, and z- values respectively of each of the points are then sorted into ascending (or descending) order. The delta values are then calculated by taking the first element in the now sorted array and subtracting the last element from it, to give values for $\Delta x$, $\Delta y$, and $\Delta z$ respectively.

Step J. The centroid to point values are then found in each direction, and these passed together with the delta values to a function, which writes the index of the current point into the appropriate one of the six head index arrays mentioned in step 6. This function applies the conditions with respect to the ratio of the deltas being greater than one etc. as described previously, and to decide for the current point which side of the head model it belongs to, and hence where it should be textured from.

Step K. Check that all points have been given a mark.

Step L and M. Perform the explicit texture mapping. Before this can be accomplished, however, the program requires some a priori knowledge of the texture map. More specifically, it requires the location of a known point on each photograph that corresponds to a known point on the head model, and the height and width of the subject's head on each photograph to provide the appropriate linear scaling factors (to be described below).

Step L. To this end, the texture map is shown via the display 11 to the user who is prompted to select (e.g. by clicking with the mouse 9) on certain predefined points, the information being stored within a two-dimensional array for later use. An example of the required points for each view are listed in Table 1.

TABLE 1

| Photo | Known Point | Top point | Bottom point | Left Point | Right point |
|---|---|---|---|---|---|
| Front | Pupil of left eye | Top of the head | Bottom of the neck | Extreme left side of head | Extreme right side of head |
| Left Side | The centre of the ear | Top of the head | Bottom of the neck | The tip of the nose | The back of the head |
| Right Side | The centre of the ear | Top of the head | Bottom of the neck | The back of the head | The tip of the nose |
| Back | Centre of head between ears | Top of the head | Bottom of the neck | Extreme left side of head | Extreme right side of head |
| Chin | A point at the intersection of an imaginary line from ear to ear, crossed by a line from chin to larynx | The tip of the chin | The left edge of the larynx | The vertex of the jawbone on the left | The vertex of the jawbone on the right |

TABLE 1-continued

| Photo | Known Point | Top point | Bottom point | Left Point | Right point |
|---|---|---|---|---|---|
| Top | Centre of head between ears | The tip of the nose | The back of the head | Extreme left side of head | Extreme right side of head |

Step M. Add the required Open Inventor nodes (described below) into the correct place in the database. The nodes required are an SoTexture2 node, an SoTextureCoordinate2 node, and an SoTextureCoordinateBinding node. This description assumes that the x,y,z coordinate of the points on the wire frame model corresponding to these predetermined points have been entered manually into the store 1.

Step N. Now perform the explicit texture mapping. For every point on the head, look at the mark it has been given and use this mark to calculate the appropriate texture co-ordinate. This process is described more particularly below.

Step O. All the required processing has now been performed, so write out the Open Inventor database to a file. This file now represents the textured Talking head model.

Determining the texture to be applied on a point-by-point basis results in the regions within the boundaries being textured correctly, as each co-ordinate is textured from the same photograph on the texture map, and hence when automatic interpolation and filtering across the polygons is performed, the 'fill-in' would be correct.

However, for points at a boundary, where a point on one side of a particular point has received a texture co-ordinate that is on an altogether different part of the texture map, application of a interpolation and filtering routine across the polygon of which the boundary points are members occurs, and thus that polygon is filled in by the region of the texture map between the two distinct texture co-ordinates. Thus, if one of the boundary points was textured from co-ordinate (0.01, 0.01), and the other from texture co-ordinate (0.99, 0.99), the entire texture map between these points could be used to fill in the polygon. This may result in a severe discontinuity in the textured model.

To overcome this problem, each point needs as many texture co-ordinates assigned to it as the number of polygons of which it is a member. Thus, in FIG. 11, point O must have an explicit texture co-ordinate for polygon OABC, another for OCDE, another for OEFG etc. These co-ordinates may be the same, and will be when neighbouring polygons of which A is a member require texturing from the same photograph. Where neighbouring polygons require texturing from a different aspect, however, the texture co-ordinates for a specific point common to both polygons are different.

Rather than considering the 3-D model as a set of vertices 101 in 3-D space which are connected up to form a plurality of polygons 102, the 3-D model may be considered to consist of a plurality of polygons 102 having defined vertices 101. It is thus necessary to find the orientation of each polygon on a boundary. The same algorithm as described so far may be used apart from changes to the way in which the delta values are determined for a polygon 102 and how to store the markings for polygons rather than vertices.

An index array for polygons is used. This gives each polygon an index number, and, for each, lists the index of each of its vertices. Typically it has the form of a two-dimensional array, where the first subscript of the array acts as an index to the polygon, the second subscript indicates a particular vertex of the polygon. Thus the array element:

Polygon[343][3]

contains to the index of the third vertex that makes up the $343^{rd}$ polygon in the SoIndexedFaceSet index list. (This duplicates the information already held, but in a more readily usable form.

With the switch from points to polygons, the decision as to whether or not a polygon lies in one of the pre-defined volumes is different. The decision may be made on the basis that if a vertex/vertices lies/lie in a volume then the whole polygon is treated as doing so. The number of vertices which must Ue within a volume before the polygon is treated as lying within the volume is determined by the system designer.

Files containing the lists of point indices lying within pre-defined volumes are read in. For each polygon, each point is accessed in turn, and the lists read in from the files searched for the index of the current point. If found in one of the lists, a counter is incremented to reflect the fact that the point's index has been found, and this counter is then compared against a threshold once all the points in the polygon have been checked. If the count exceeds this threshold, then the polygon is considered to lie within the volume where its points' indices were found, and its index is written into the appropriate one of the six *_head_index arrays (the *_head_arrays are used to hold the polygon indices that need texturing from a particular direction).

The function used to decide which polygon belongs to which region of the texture map requires a measurement of the distance of the polygon to the mean centroid of the head, for each direction. It is therefore necessary to determine which point of the polygon to use. The first vertex of the polygon may be used as the point from which to measure the centroid-to-polygon values. Alternatively, a centroid point for each polygon may be calculated from which to take the measurements. This centroid is calculated in exactly the same manner as the whole head model centroid, but only takes into account the vertices of the current polygon. The co-ordinates thus found are used as the discrete location of the polygon to calculate the head centroid-to-polygon centroid values.

The switch from points to polygons means that a new procedure is required to find the delta values across the polygons. Previously, surrounding points were found, whose co-ordinates were then sorted to give the bounding box. The dimensions of this bounding box were then the delta values.

The same basic procedure can be applied to polygons, and is in fact fundamentally simpler. With the points approach, other points were required to form a conceptual surface across which deltas could be taken. A polygon however is a surface in itself. Deltas can be taken from the points which form the vertices, and this is achieved by sorting the ordinates of the co-ordinates of the vertices of a current polygon to give the bounding box around the polygon. As with the points approach, the dimensions of this bounding box are then the delta values required by the boundary determining function.

Figure 12:
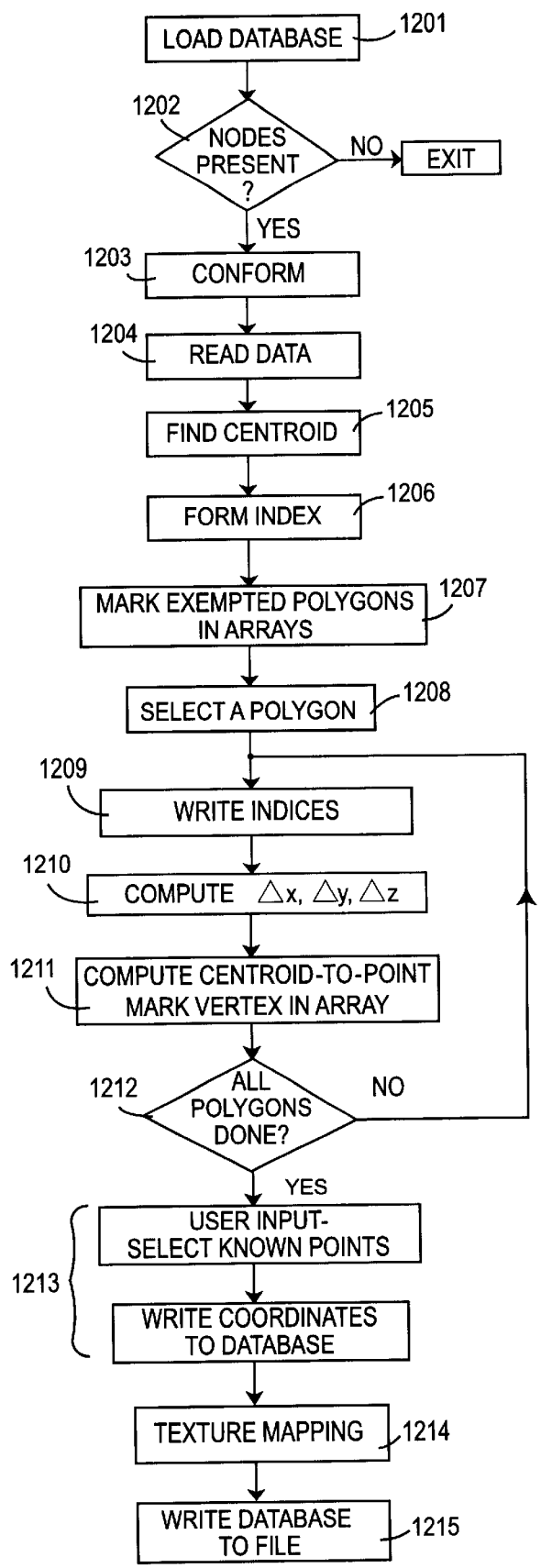

Thus the texturing operation is almost identical to that used with the point-to-point embodiment previously described, with the appropriate changes for polygons. Again it is procedural, and is described below and in the flowchart of FIG. 12.

Step 1201. Load the Open Inventor database.

Step 1202. Check the database for SoCoordinate3 node and SoIndexedFaceSet node—exit if not found.

Step 1203. Conform the head to the desired shape.

Step 1204. Read the head co-ordinates and indices into head_coords array and vertex_index array respectively. Also get a count of each and store them.

Step 1205. From the head vertex co-ordinates, calculate the centroid of the model.

Step 1206. Form an index of polygons as described earlier.

Step 1207. For each polygon in the model, see if it lies within any of the predefined volumes, and if so write the index of the polygon into the appropriate array, as described earlier. Arrays were defined for each different photograph that was to be used as a texture map, i.e. front_head_index, chin_head_index, back_head_index, left_head_index, right head_index, top_head_index arrays.

Step 1208. Those polygons not marked by the volumes are now eligible for processing using the delta method. For every polygon in the model, see if it has already been assigned to one of the _head_index arrays, and if so go on to the next polygon. If not, process using the delta method.

To perform the delta method,

Step 1209. Write into the connected_points array referred to earlier the indices of all the vertices of the current polygon.

Step 1210 and 1211. Perform Steps 9 and 10 of the previously described delta method.

Step 1212. Check that all polygons have been given a mark.

Step 1213. Perform steps L and M of the previously described method.

14. Now perform the explicit texture mapping. For every polygon on the head, look at the mark it has been given and use this mark to calculate the appropriate texture co-ordinate for each of its points.

15. All the required processing has now been performed, so write out the Open Inventor database to a file. This file now represents the textured Talking head model.

The process undertaken for the explicit point-to-point mapping from the texture map to the point in question will now be addressed. The term texturing refers to applying a 2-D pixel image onto a 3-D shape object. In the case of the head, the pixel image used is the composite image containing the photographs of the Human subject taken from the different aspects as shown in FIG. 3. This image is the texture map referred to previously. Hereinafter, the letter s is used for the horizontal texture co-ordinate, and the letter t used for the vertical co-ordinate. The texture map is seen to be a 1 by 1 square, with possible co-ordinate values ranging from 0.0 to 1.0 in each direction, regardless of the actual width to height ratio of the image.

Texture co-ordinates are assigned to each vertex of a polygon within the 3-D shape object.

During the mapping process, if the pixels in the texture map do not match up exactly with the pixels in the polygon, Open Inventor uses a filtering process to assign texture pixels to the object. This process is also used to 'fill in' the polygon with the texture, Open Inventor interpolating across the polygon between the explicitly defined vertex points to fill in the rest of the polygon. Conceptually, the texture map may be thought of as a rubber sheet, with explicit co-ordinates being 'pegged' onto the vertices of the head while the rest of the sheet expands or contracts appropriately to fill the spaces within the polygons. This process is all performed automatically, the user having only to specify the co-ordinate within the texture map to peg to the specific point on the head.

As far as the Open Inventor specifics go, three types of node are used to realise the texturing. The first of these is the SoTexture2 node, and this contains a filename field in which the filename of the image to be used as the texture map is stored. The other relevant field is the model field. The model field specifies how the texture applied is affected by the underlying colour of the object, the options being modulate, whereby the texture colour is multiplied by the underlying colour to produce an overall colour, or decal whereby the texture is applied without being affected by the object's underlying colour.

The next node required for explicit texture mapping is an SoTextureCoordinate2 node, and this contains the explicit set of 2-D texture co-ordinates that are to be used to map to each point. The method of relating these co-ordinates to the head model is stored within the third type of node, an SoTextureCoordinateBinding node, which specifies whether the texture co-ordinate list is to bind to the co-ordinates in the SoCoordinate3 node per vertex (i.e. the order in which they are in the list), or per vertex indexed (i.e. use the indexing information). These three node types were used when texturing the Talking head.

Firstly, consider the texture map, and in particular the front face photograph 22 within the texture map. From the point-clicking procedure within the shape conformance program the system knows where the positions of certain features are on the texture map, i.e. eye pupil position, sides of the head, top and bottom of head etc. Similarly information can be obtained to find the co-ordinates of certain features on the head model e.g. the position of the centre of the left eye, right eye etc. This information will of course be in 3-D co-ordinates, however, whereas the texture map is only 2-D. This apparent lack of information within the texture map is overcome by considering the texture map to be simply projected onto the surface of the head as if it were a 2-D surface. Once the orientation of a point or polygon has been determined, the vertex or polygon in question is then treated as lying on a flat plane. The texture map is then simply projected on to this now conceptually flat surface. In effect, once a point has been determined as 'belonging' to a particular plane, one need then only consider the projection of that point onto the plane, rather than the actual 3-D location of the point itself. For example, if a point (1, 2, 3) had been marked as belonging to the x-z plane, one need only consider the values 1 and 3 as the position of the point on the x-z plane. In this manner, the extra dimension embodied in the 3-D co-ordinate is 'thrown away' in order to fit with the 2-D information available in the texture map. Thus a 3-D co-ordinate is mapped to a 2-D co-ordinate.

The solution to the problem of explicitly mapping each vertex to a point on the texture map is as follows. One knows the location of certain features on the texture map, and one also knows the 2-D location of the same certain features on the head model, within a particular plane. A linear scaling is then required from point to point in order to map each vertex explicitly to the texture map. This linear scaling is made easier by remembering that at this stage in the head conformance process the head shape has been altered to approximate the shape and features of the subject, and so a direct linear mapping can be performed.

Such a mapping works as follows: From the point clicking procedure, the position of the centre of the left eye (say) within the front face photograph is known on the texture map, and has co-ordinates ($s_{eye}$, $t_{eye}$). Similarly, the position of the centre of the left eye is known within the head model, and has co-ordinates ($x_{eye}$, $y_{eye}$) Also, the height and width of the head is known on the photograph, and also on the head model. The object is then to texture a point anywhere else on the head model's face, say point ($x_{face}$, $y_{face}$) with the appropriate texture co-ordinate ($s_{texture}$, $t_{texture}$). Considering the head model, there will be some vector ($x_{tran}$, $y_{tran}$) that gets from ($x_{face}$, $y_{face}$) to ($x_{eye}$, $y_{eye}$), given by:

$$\begin{pmatrix} x_{tran} \\ y_{tran} \end{pmatrix} = \begin{pmatrix} x_{eye} - x_{face} \\ y_{eye} - y_{face} \end{pmatrix} \quad \text{Equation 1}$$

Similarly, there will be a vector for the texture map ($s_{tran}$, $t_{tran}$) that gets from ($s_{texture}$, $t_{texture}$) to ($s_{eye}$, $t_{eye}$) given by:

$$\begin{pmatrix} s_{tran} \\ t_{tran} \end{pmatrix} = \begin{pmatrix} s_{eye} - s_{texture} \\ t_{eye} - t_{texture} \end{pmatrix} \quad \text{Equation 2}$$

This second vector ($s_{tran}$, $t_{tran}$) is related to the first vector ($x_{tran}$, $y_{tran}$) by the ratios of width of the Talking head model to width of the head on the photograph for the x direction, and height of the head model to height of the head on the photograph in the y direction. Thus ($s_{tran}$, $t_{tran}$) may be found from ($x_{tran}$, $y_{tran}$) by:

$$\begin{pmatrix} s_{tran} \\ t_{tran} \end{pmatrix} = \begin{bmatrix} \left( \frac{photo\_head\_width}{talking\_head\_width} \right) & 0 \\ 0 & \left( \frac{photo\_head\_height}{talking\_head\_height} \right) \end{bmatrix} \begin{pmatrix} x_{tran} \\ y_{tran} \end{pmatrix} \quad \text{Equation 3}$$

whence ($s_{texture}$, $t_{texture}$) can be found using:

$$\begin{pmatrix} s_{texture} \\ t_{texture} \end{pmatrix} = \begin{pmatrix} s_{eye} - s_{tran} \\ t_{eye} - t_{tran} \end{pmatrix} \quad \text{Equation 4}$$

for ($x_{face}$, $y_{face}$). Thus by knowing the co-ordinates of matching points on the head model and the respective widths and heights, the appropriate explicit texture co-ordinate can be found for any point on the head.

The technique has been described in relation to a model and texture images which share the same co-ordinate system, so that the matrix in Equation 3 is a diagonal matrix. However it is feasible that this may not be the case; in that instance a more complex transformation matrix will result. For instance, the directions of view used to generate the texture map 2 may be as shown in FIG. 13 i.e. with cameras at 60° angles to each other, a view also being taken from the top and the bottom. The co-ordinate axes for this arrangement are as shown in FIG. 13 as a, b, c and y (in both positive and negative directions). With this arrangement, it is necessary to transform the polygon position in the model co-ordinate system into the texture map co-ordinate system. Whilst this clearly requires additional processing over the arrangement in which the model and the texture map share the same co-ordinate system, the invention may still be applied.

One effect of texturing different parts of the model from different views of the texture map is that discontinuities of brightness and/or colour may arise at the boundary between the area of the model that is textured from one view and an adjacent area that is textured from another view. In a modified version of the method, therefore, the texturing process includes an adjustment step to reduce such discontinuities by considering one view (perhaps the front) to be a reference view and adjusting the texture that is applied to other areas.

One specific method of doing this will now be described. This performs the adjustment in two stages: the first stage makes adjustment to account for overall differences between views (in this example, only brightness differences, though colour could be included too) and the second stage compensates for boundary discontinuities. The method proceeds as follows:

1. Apply texture from a single view (the reference view) to the whole of the conformed model (that is, so much of it as visible from that direction of view), regardless of the markings discussed above.
2. Form a two dimensional image of the model by cylindrical or spherical projection, with the texture information applied.
3. Save the projected image.
4. Repeat steps 1 and 2 for a further view of the texture map.
5. Adjust the luminance of all the pixels of the new projected image, by scaling and/or shifting such as to minimise the luminance differences between defined pixels of the new image and of the reference image. The defined pixels could be the whole image or could be patches where the hue and luminance are similar—for example a patch of skin or hair. (This is the first stage referred to above).
6. Save the new projected image.
7. Repeat steps 4, 5 and 6 for the remaining views.
8. Determine boundaries between images with reference to the orientation of polygons. Polygons marked as being textured from different photographs but with shared edges would be identified as the boundaries.
9. Compose a composite image from the projected image, each region of the composite image which corresponds to a given polygon being copied from the appropriate one of the projected images, according to the markings described earlier.
10. Adjust to blend the discontinuities at the boundaries (the second stage referred to above). For each pair of 10×10 pixel blocks on either side of the boundary the pixel values are adjusted to reduce any colour differences, and progressively smaller adjustments are made to blocks further away from the boundary. A low pass filter operation may be used for this if desired. Note that, if R, G, B component values are adjusted, then luminance blending will also occur.
11. Project the vertices of the conformed model into the same 2D space as the texture map to determine the relevant 2D texture coordinates for each vertex, and save to a file as a textured, adjusted model.

If desired, the overall adjustment step could be performed on the texture map itself rather than as part of the process set out above.

What is claimed is:

1. A method of generating an image representing a three-dimensional object, the three-dimensional object being modelled as (a) a stored set of parameters representing a model of a three-dimensional object and (b) at least two two-dimensional images of the object, each image representing the object from a fixed direction of view with respect to a virtual space, the parameters comprising parameters defining the positions of a plurality of vertex points in the virtual space and parameters defining relationships between vertex points and hence surface elements of the object, the method comprising, for a surface element;

determining for the said surface element a measure relative to each fixed direction of view, each said measure being representative of the deviation of the surface of the element from the normal to the fixed direction of view;

identifying the fixed direction of view which exhibits the least said deviation;

identifying within that one of the two-dimensional images which corresponds to the identified fixed direction of view a portion thereof corresponding to a projection thereon of an area defined by the vertices of the surface element;

storing a three-dimensional representation of the object, the three-dimensional representation being available for display prior to actual display generation and having a shape determined by the stored parameters and having surface detail determined by the said identified portions of the two-dimensional images, said surface detail being fixed on the surface of the object irrespective of a viewing direction thereof; and generating a two-dimensional image representing the three-dimensional object by projecting the stored three-dimensional representation in a direction corresponding to said specified viewing direction.

2. A method as in claim 1 in which the allocation of surface elements to fixed directions of view is, for selected ones of the elements, predefined and the steps of determining and identifying are carried out only for the remaining surface elements.

3. A method as in claim 1 in which the measure is determined by:

finding the co-ordinates of the vertices of the surface element with respect to a co-ordinate system corresponding to the fixed directions of view;

determining the maximum difference in the co-ordinates in each of the fixed directions of view;

forming ratios of the maximum differences with respect to each fixed direction of view.

4. A method as in claim 1 wherein the measure is determined by finding the co-ordinates of the vertices of the surface element with respect to a co-ordinate system corresponding to the fixed directions of view;

ascertaining the dimensions of a polyhedron, the faces of which are normal to the respective fixed directions of view and which encloses the vertices of the surface element;

calculating the length of each side of the polyhedron in each fixed direction of view; and forming ratios of each length with respect to each fixed direction of view.

5. A method as in claim 3 in which the fixed direction of view which exhibits least deviation corresponds to the fixed direction of view for which the ratios with respect to that view are the greatest.

6. A method as in claim 1 including the step of:

adjusting brightness and/or colour values of the surface detail to be applied, such as to reduce discontinuities between a surface element in respect of which one fixed direction of view has been identified and a surface element in respect of which another fixed direction of view has been identified.

7. A method as in claim 6 in which the adjusting step comprises:

(a) comparing, for surface elements represented in two or more of said two-dimensional images, brightness and/or colour values of the surface detail of those elements as represented in the two-dimensional images, and adjusting the values from at least one image in a sense such to reduce the extent to which they differ; and (b) performing further such adjustments such as to reduce discontinuities between a surface element in respect of which one fixed direction of view has been identified and a immediately adjacent surface element in respect of which another fixed direction of view has been identified.

generating a two-dimensional image representing the three-dimensional object by projecting the stored three-dimensional representation in a direction corresponding to said specified viewing direction.

8. Apparatus for generating an image representing a three-dimensional object, said apparatus comprising:

a store for storing a set of parameters representing a model of a three-dimensional object and at least two two-dimensional images of the object, each image representing the object from a fixed direction of view with respect to a virtual space, the parameters comprising parameters defining the positions of a plurality of vertex points in the virtual space and parameters defining relationships between vertex points and hence surface elements of the object;

control means arranged in operation (a) to determine for a surface element a measure relative to each fixed direction of view, each said measure being representative of the deviation of the surface of the element from the normal to the fixed direction of view;

(b) to identify the fixed direction of view which exhibits the least said deviation; and (c) to identify, within that one of the two-dimensional images which corresponds to the identified fixed direction of view a portion thereof corresponding to a projection of the surface element; and means operable to storing a three-dimensional representation of the object, the three-dimensional representation being available for display prior to actual display generation and having a shape determined by the stored parameters and having surface detail determined by the said identified portions of the two-dimensional images, said surface detail being fixed on the surface of the object irrespective of a viewing direction thereof.

9. Apparatus for generating an image representing a three-dimensional object, said apparatus comprising:

a store for storing a set of parameters representing a model of a three-dimensional object and at least two two-dimensional images of the object, each image representing the object from a fixed direction of view with respect to a virtual space, the parameters comprising parameters defining the positions of a plurality of vertex points in the virtual space and parameters defining relationships between vertex points and hence surface elements of the object; and control means arranged in operation (a) to determine for a surface element a measure relative to each fixed direction of view, each said measure being representative of the deviation of the surface of the element from the normal to the fixed direction of view;

(b) to identify the fixed direction of view which exhibits the least said deviation; and (c) to identify, within that one of the two-dimensional images which corresponds to the identified fixed direction of view a portion thereof corresponding to a projection thereon of an area defined by the vertices of the surface element and storing a three-dimensional representation of the object, the three-dimensional representation being available for display prior to actual display generation and having a shape determined by the stored parameters and having surface detail determined by the said identified portion of a two-dimensional image, whereby the image to be generated may be formed having a shape determined by the stored parameters and having surface detail determined by the two-dimensional images, said surface detail being fixed on the surface of the object irrespective of a viewing direction thereof.

10. Apparatus for generating an image representing a three-dimensional object, said apparatus comprising:

a store for storing a set of parameters representing a model of a three-dimensional object and at least two two-dimensional images of the object, each image representing the object from a fixed direction of view with respect to a virtual space, the parameters comprising parameters defining the positions of a plurality of vertex points in the virtual space and parameters defining relationships between vertex points and hence surface elements of the object; and control means arranged in operation
   (a) to identify those vertices which, together with the said vertex, contribute to representing a surface element which includes the said vertex;
   (b) to determine for the said surface elements a measure relative to each fixed direction of view, each said measure being representative of the deviation of the surfaces of the elements from the normal to the fixed direction of view;
   (c) to identify the fixed direction of view which exhibits the least said deviation; and
   (d) to identify within that one of the two-dimensional images which corresponds to the identified fixed direction of view a portion thereof corresponding to a projection thereon of an area defined by the vertices of the surface element and storing a three-dimensional representation of the object, the three-dimensional representation being available for display prior to actual display generation and having a shape determined by the stored parameters and having surface detail determined by the said identified portion of a two-dimensional image, whereby the image to be generated may be formed having a shape determined by the stored parameters and having surface detail determined by the two-dimensional images, said surface detail being fixed on the surface of the object irrespective of a viewing direction thereof.

11. A method of generating an image representing a three-dimensional object, the three-dimensional object being modelled as (a) a stored set of parameters representing a model of a three-dimensional object and (b) at least two two-dimensional images of the object, each image representing the object from a fixed direction of view with respect to a virtual space, the parameters comprising parameters defining the positions of a plurality of vertex points in the virtual space and parameters defining relationships between vertex points and hence surface elements of the object, the method including:

storing a three-dimensional representation of the object, the three-dimensional representation being available for display prior to actual display generation and having a shape determined by the stored parameters and having surface detail determined from one of the said two-dimensional images, said surface detail being fixed on the surface of the object irrespective of a viewing direction thereof;

adjusting brightness and/or colour values of the surface detail to be applied, to reduce discontinuities between a surface element in respect of which one fixed direction of view has been identified and a surface element in respect of which another fixed direction of view has been identified;

receiving control information specifying a viewing direction; and generating a two-dimensional image representing the three-dimensional object by projecting the stored three-dimensional representation in a direction corresponding to said specified viewing direction.

12. A method of generating an image representing a three-dimensional object, the three-dimensional object being modeled as (a) a stored set of parameters representing a model of a three-dimensional object and (b) at least two two-dimensional images of the object, each image representing the object from a fixed direction of view with respect to a virtual space, the parameters comprising parameters defining the positions of a plurality of vertex points in the virtual space and parameters defining relationships between vertex points and hence surface elements of the object, the method comprising, for a surface element:

determining for the said surface element a measure relative to each fixed direction of view, each said measure being representative of the deviation of the surface of the element from the normal to the fixed direction of view; identifying the fixed direction of view which exhibits the least said deviation;

identifying within that one of the two-dimensional images which corresponds to the defined fixed direction of view a portion thereof corresponding to a projection thereon of an area defined by the vertices of the surface element; and storing a three-dimensional representation of the object prior to display, the three-dimensional representation having a shape determined by the stored parameters and having surface detail determined by the said identified portions of the two-dimensional images, said surface detail being fixed on the surface of the object irrespective of a viewing direction thereof.

13. Apparatus for generating an image representing a three-dimensional object, said apparatus comprising:

a store for storing a set of parameters representing a model of a three-dimensional object and at least two two-dimensional images of the object, each image representing the object from a fixed direction of view, the parameters comprising parameters defining the positions of a plurality of vertex points in a virtual space and parameters defining relationships between vertex points and hence surface elements of the object;

control means arranged in operation
   (a) to determine for a surface element a measure relative to each fixed direction of view, each said measure being representative of the deviation of the surface of the element from the normal to the fixed direction of view;
   (b) to identify the fixed direction of view which exhibits the least said deviation; and
   (c) to identify, within that one of the two-dimensional images which corresponds to the identified fixed direction of view a portion thereof corresponding to a projection of the surface element; and single means operable to storing a three-dimensional representation of the object, the three-dimensional representation being available for display prior to actual display generation and having a shape determined by the stored parameters and having surface detail determined by the said identified portions of the two-dimensional images adjusted according to a specified viewing direction.

* * * * *